US009831536B2

(12) United States Patent
Lim et al.

(10) Patent No.: US 9,831,536 B2
(45) Date of Patent: Nov. 28, 2017

(54) BATTERY MODULE (71) Applicant: SAMSUNG SDI CO., LTD., Yongin-si, Gyeonggi-do (KR)

(72) Inventors: Young-Bin Lim, Yongin-si (KR); Myung-Chul Kim, Yongin-si (KR); Seung-Woo Yang, Yongin-si (KR); Jin-Bok Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 206 days.

(21) Appl. No.: 14/605,901

(22) Filed: Jan. 26, 2015

(65) Prior Publication Data
US 2015/0214583 A1    Jul. 30, 2015

(30) Foreign Application Priority Data
Jan. 28, 2014  (KR) .......................... 10-2014-0010162

(51) Int. Cl.
| | |
|---|---|
| *H01M 10/04* | (2006.01) |
| *H01M 10/48* | (2006.01) |
| *H01M 2/10* | (2006.01) |
| *H01M 2/20* | (2006.01) |
| *G01K 1/14* | (2006.01) |

(52) U.S. Cl.
CPC ............ *H01M 10/486* (2013.01); *G01K 1/14* (2013.01); *H01M 2/1016* (2013.01); *H01M 2/202* (2013.01); *H01M 2200/10* (2013.01)

(58) Field of Classification Search
CPC .......................... H01M 10/486; H01M 10/425
See application file for complete search history.

(56) References Cited

U.S. PATENT DOCUMENTS

| | | | | |
|---|---|---|---|---|
| 2002/0182480 | A1* | 12/2002 | Hanauer | H01M 2/1016 429/62 |
| 2010/0124693 | A1* | 5/2010 | Kosugi | G01R 31/3644 429/92 |
| 2010/0285340 | A1* | 11/2010 | Matsunaga | G01D 11/245 429/90 |
| 2012/0088135 | A1* | 4/2012 | Kim | H01M 2/206 429/90 |

* cited by examiner

*Primary Examiner* — Olatunji Godo
(74) *Attorney, Agent, or Firm* — Lewis Roca Rothgerber Christie LLP (57) ABSTRACT

A battery module includes a plurality of battery cells, a temperature sensor and a case. The plurality of battery cells are aligned in one direction. The temperature sensor has a first surface contacting at least one battery cell of the plurality of battery cells to measure a temperature of the at least one battery cell. The case presses against a second surface of the temperature sensor opposite to the first surface of the temperature sensor. In the battery module, the contact between the first surface of the temperature sensor and the battery cell is maintained by the case. Accordingly, the temperature sensor can precisely measure the temperature of the battery cell, thereby improving the safety of the battery module.

12 Claims, 6 Drawing Sheets

BATTERY MODULE

CROSS-REFERENCE TO RELATED APPLICATION

This application claims priority to and the benefit of Korean Patent Application No. 10-2014-0010162, filed on Jan. 28, 2014, in the Korean Intellectual Property Office, the contents of which are incorporated herein by reference in their entirety.

BACKGROUND

1. Field

Aspects of the present invention relate to a battery module.

2. Description of the Related Art

A high-power battery module using a non-aqueous electrolyte with a high energy density has recently been developed. The high-power battery module is configured as a high-voltage or large-capacity battery module manufactured by connecting a plurality of battery cells in parallel or series so as to be used in driving motors for devices requiring high power, e.g., electric vehicles and the like. Further, a battery pack can be configured by electrically connecting such a plurality of battery modules to one another.

As the number of devices employing such battery modules increases, studies have been conducted to improve the productivity of the battery modules. As the exterior of devices using the battery modules is diversified, shape of the battery module must also be correspondingly varied. However, as safety is a basic requirement of a battery module, studies on the structure of a battery module capable of satisfying all these requirements have been conducted in various fields.

SUMMARY

Embodiments of the present invention provide a battery module which can improve safety by precisely measuring the temperature of a battery cell.

According to embodiments of the present invention, a battery module includes: a plurality of battery cells aligned in one direction; a temperature sensor having a first surface contacting at least one battery cell of the plurality of battery cells to measure a temperature of the at least one battery cell; and a case configured to press against a second surface of the temperature sensor opposite to the first surface of the temperature sensor, wherein the contact between the first surface of the temperature sensor and the battery cell is maintained by the case.

The case may include end plates respectively positioned adjacent one or more outermost battery cells of the plurality of battery cells; a connecting plate configured to connect the end plates; and a cover configured to cover surfaces of the plurality of battery cells from which electrode tabs protrude.

The temperature sensor may be in contact with a surface of the at least one battery cell, wherein an electrode tab of the electrode tabs of the plurality of battery cells protrudes from the surface of the at least one battery cell toward the cover.

The battery module may further include bus-bars configured to electrically connect the electrode tabs of the plurality of battery cells; and a bus-bar holder positioned to cover surfaces of the electrode tabs of the plurality of battery cells, the bus-bar holder being positioned between the plurality of battery cells and the bus-bars, wherein the cover covers the bus-bars and the bus-bar holder.

The temperature sensor may be configured to be inserted through an opening in the bus-bar holder so as to contact the at least one battery cell of the plurality of battery cells.

The case may have an elastic part pressing the temperature sensor in the direction of the at least one battery cell.

The elastic part may be a leaf spring formed by cutting the case.

The leaf spring may have a rib extended along a length of the leaf spring.

The elastic part may be a leaf spring, coil spring or rubber piece mounted between the case and the temperature sensor.

The second surface of the temperature sensor may have a groove, and the elastic part may have a protruding portion configured to be mounted in the groove.

The first surface of the temperature sensor may include a metal portion; the second surface of the temperature sensor may include a resin portion configured to cover an outer surface of the metal portion; and the temperature sensor may include a head in contact with an inner surface of the metal portion, the head being configured to measure a temperature of the at least one battery cell; and a connecting portion configured to provide the temperature of the at least one battery cell measured by the head to a protective circuit module or a battery control system.

At least portions of the head and the connecting portion may be positioned inside an exterior structure formed by the metal portion and the resin portion.

Other features and advantages of the present invention will become more fully apparent from the following detailed description, taken in conjunction with the accompanying drawings.

Terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

According to the battery module in the embodiments of the present invention, the temperature sensor contacts the battery cell to precisely measure a temperature of the battery cell, thereby improving the safety of the battery module.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein.

In the drawings, dimensions may be exaggerated for clarity of illustration. It is to be understood that when an element is referred to as being "between" two elements, it can be the only element between the two elements, or one or more intervening elements may also be present. Also, like reference numerals refer to like elements throughout.

DETAILED DESCRIPTION

In the following detailed description, only certain exemplary embodiments of the present invention have been shown and described, simply for purposes of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Figure 1:
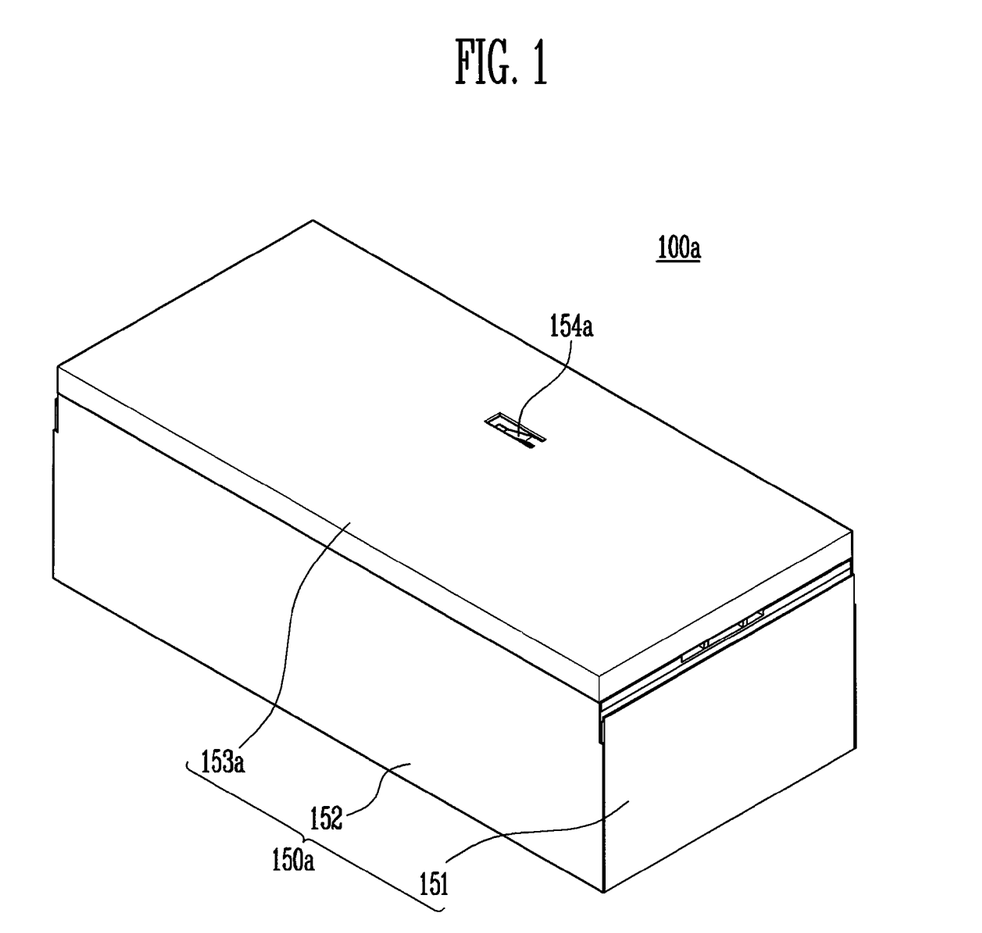
FIG. 1 is a perspective view of a battery module according to an embodiment of the present invention.
Figure 2:
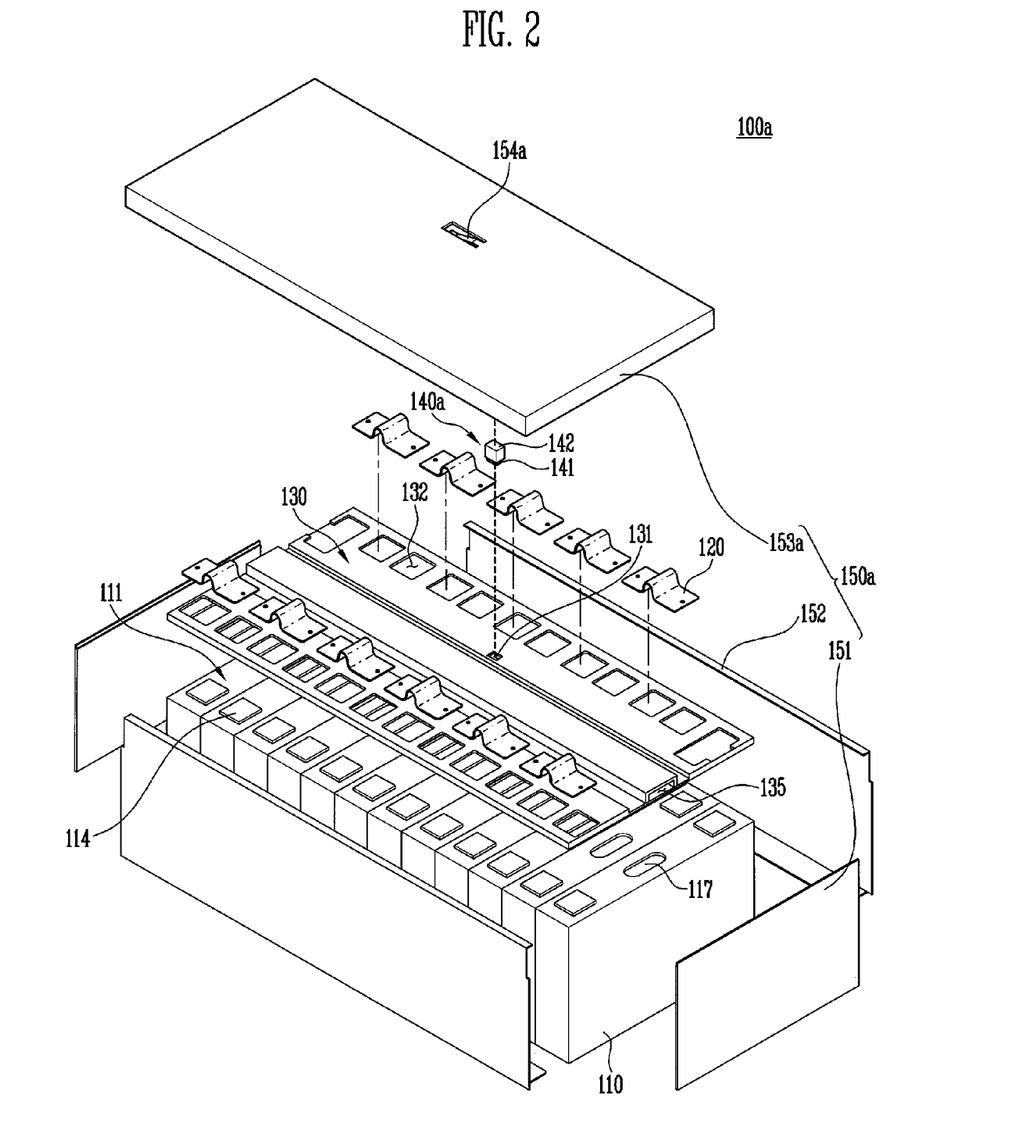
FIG. 2 is an exploded perspective view of the battery module shown in FIG. 1.

FIG. 1 is a perspective view of a battery module 100a according to an embodiment of the present invention. FIG. 2 is an exploded perspective view of the battery module 100a shown in FIG. 1. Hereinafter, the battery module 100a according to this embodiment will be described with reference to FIGS. 1 and 2.

As shown in FIGS. 1 and 2, the battery module 100a according to this embodiment includes a plurality of battery cells 110 aligned in one direction with a temperature sensor 140a mounted so that a first surface 141 of the temperature sensor 140a contacts at least one battery cell 110 of the plurality of battery cells 110, and a case 150a contacts a second surface 142 of the temperature sensor 140a. The first surface 141 of the temperature sensor 140a may maintain contact with the battery cell 110 due to pressure from the case 150a.

The battery cell 110 generates energy. The battery cell 110 may be configured as a plurality of battery cells 110 to be aligned in one direction.

Here, each battery cell 110 may include a battery case, one surface 111 of which can be opened, and an electrode assembly and an electrolyte, both of which are accommodated in the battery case. In this case, the electrode assembly and the electrolyte may generate energy through an electrochemical reaction therebetween. The battery case may be hermetically sealed at the one surface 111 of the battery cell 110 by, for example, a cap assembly. In addition, electrode tabs 114, i.e., positive and negative electrode terminals having different polarities, may protrude from the same one surface 111 of the battery cell 110. A vent portion 117, acting as a passage through which gas generated in the battery cell 110 is exhausted to the outside of the battery cell 110, may be further formed in the one surface 111 of the battery cell 110 as a safety mechanism for the battery cell 110.

The plurality of battery cells 110 may be electrically connected through bus-bars 120. Here, the bus-bar 120 is a member which implements a serial or parallel electrical connection by connecting electrode tabs 114 of adjacent battery cells 110 to each other. The bus-bar 120 may be fixed to the electrode tab 114 through, for example, a process such as welding. The bus-bar 120 may be supported by a bus-bar holder 130.

The bus-bar holder 130 may be positioned on the one surface 111 of one of the battery cells 110 from which the electrode tab 114 protrudes, and may support the bus-bars 120. Specifically, the bus-bar holder 130 may be positioned between the plurality of battery cells 110 and the bus-bars 120 so as to cover the surfaces 111 of the plurality of battery cells 110 from which the electrode tabs 114 of the plurality of battery cells 110 protrude, and accordingly, the bus-bars 120 can be supported by the bus-bar holder 130. In this case, an opening 132 may be formed in the bus-bar holder 130 through which each bus-bar 120 supported on a top surface of the bus-bar holder 130 can contact the respective electrode tab 114. The bus-bar holder 130 may be made of an insulating material so as not to short-circuit the battery cell 110. The bus-bar holder 130 may be formed to a size where the bus-bar holder 130 can cover all the one surfaces 111 of the plurality of battery cells 110. A gas passage 135 through which gas from the vent portion 117 is exhausted may be provided in the bus-bar holder 130. However, the bus-bar holder 130 is not necessarily an essential member, and it will be apparent that the bus-bar 120 may be connected to the electrode tab 114 of the battery cell 110 without using the bus-bar holder 130.

The temperature sensor 140a measures a temperature of the battery cell 110 by being mounted so that the first surface 141 of the temperature sensor 140a contacts at least one battery cell 110 of the plurality of battery cells 110.

Here, the temperature sensor 140a directly measures a temperature of the battery cell 110, and the resistance of the temperature sensor 140a is changed by, for example, a surrounding temperature. The temperature sensor 140a, for example, may have positive or negative temperature coefficient characteristics. In this case, the first surface 141 of the temperature sensor 140a contacts the battery cell 110, and hence the temperature sensor 140a can measure an exact temperature of the battery cell 110. The temperature sensor 140a also measures a temperature of the bus-bar 120 and compares that temperature to the temperature of the battery cell 110. Accordingly, it is possible to precisely measure a temperature of the battery module 100a in which the change in current is great. The temperature sensor 140a provides the measured temperature to a protective circuit module or a battery control system so that the battery module 100a can be safely controlled.

Meanwhile, although it has been illustrated in FIGS. 1 and 2 that only one temperature sensor 140a is used, the temperature sensor 140a may be configured as a plurality of temperature sensors to measure temperatures of different battery cells 110. For example, one temperature sensor 140a may contact a battery cell 110 positioned at the center of the battery module 100a as shown in FIG. 2, and another temperature sensor 140a may contact a battery cell 110 positioned toward the outside of the battery module 100a, thereby obtaining a more exact temperature measurement.

The case \ 150a surrounds outer surfaces of the plurality of battery cells 110.

Here, the case 150a may include an end plate 151, a connecting plate 152 and a cover 153a. The end plate 151 is disposed outside one or both of the outermost battery cells 110 of the plurality of battery cells 110, and may fix the arrangement and direction of the plurality of battery cells 110. The end plate 151 may be configured as a pair of end plates 151 respectively positioned at the outside of the wide surfaces of both the outermost battery cells 110. The pair of end plates 151, together with the connecting plate 152 connecting the pair of end plates 151 and the cover 153a, constitute a housing of the battery module 100a, thereby protecting the battery cells 110. In this case, the end plate 151 may be coupled to the connecting plate 152 and the cover 153 through, for example, a process such as welding.

The cover 153a may be positioned to cover the surfaces from which the electrode tabs 114 of the plurality of battery cells 110 protrude. The cover 153a may cover the bus-bars 120 and the bus-bar holder 130 so that they are not exposed to the outside.

Figure 3:
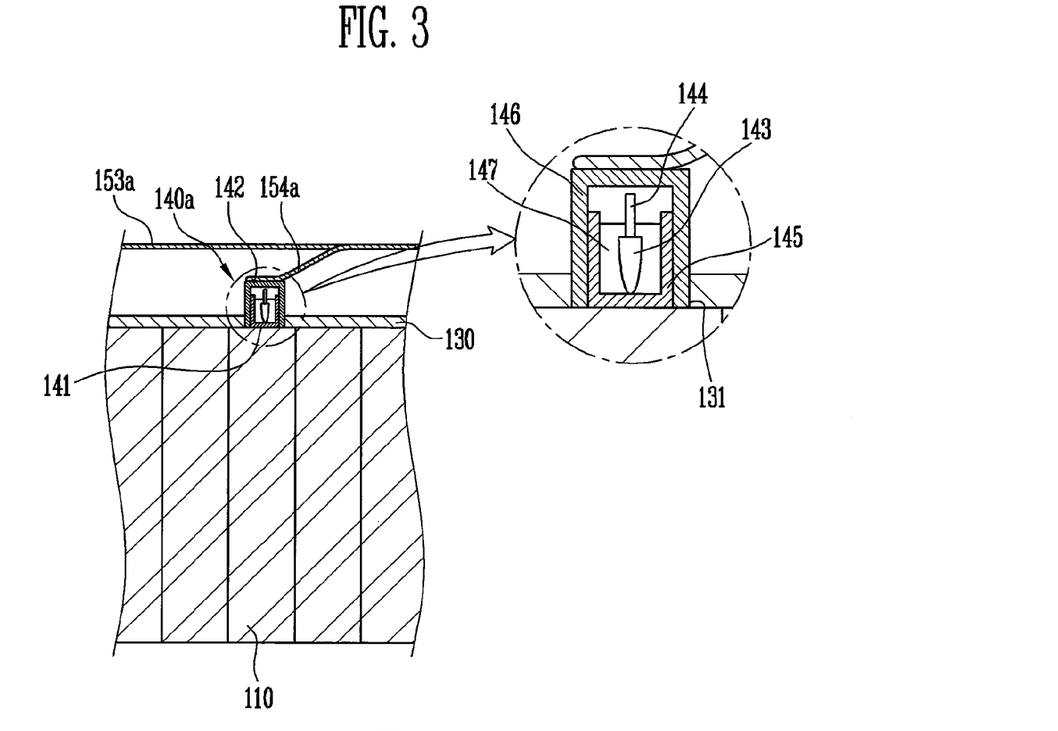
FIG. 3 is a sectional view of the battery module shown in FIG. 1.

FIG. 3 is a sectional view of the battery module 100a shown in FIG. 1. Hereinafter, the battery module 100a according to this embodiment will be described in detail with reference to FIGS. 1 to 3.

As described above, the temperature sensor 140a may be mounted so that the first surface 141 of the temperature sensor 140a contacts the battery cell 110. In this case, it may be important that the position of the temperature sensor 140a is not changed so as to perform an exact temperature measurement of the temperature sensor portion 140a. Particularly, it is important that the temperature sensor 140a is in close contact with the battery cell 110 along the Z-axis direction, that is, along a direction from which the electrode tab 114 protrudes. This is because a more exact temperature measurement is possible by reducing contact resistance.

In this embodiment, a method where the case 150a presses the temperature sensor 140a in the direction of the battery cell 110 may be employed to reduce contact resistance by preventing the movement of the temperature sensor 140a along the Z-axis direction. Specifically, the cover 153a of the case 150a may have an elastic part to press the second surface 142 of the temperature sensor 140a, so that the first surface 141 of the temperature sensor 140a contacts the surface 111 from which the electrode tab 114 of the battery cell 110 protrudes. In this embodiment, the elastic part may be a leaf spring 154a cut from the cover 153a and configured to be elastic, where an end portion of the leaf spring 154a presses the second surface 142 of the temperature sensor 140a so that the temperature sensor 140a can be in close contact with the battery cell 110. Thus, the contact resistance between the temperature sensor 140a and the battery cell 110 can be reduced, and accordingly, it is possible to perform a more exact temperature measurement. In this case, the leaf spring 154a is created from the cover 153a covering the top surface of the battery module 100a by cutting the cover 153a and without using any separate member. Accordingly, it is possible to reduce the manufacturing cost of the battery module 100a.

Meanwhile, the movement of the temperature sensor 140a along the Z-axis direction is prevented or reduced by using the leaf spring 154a of the cover 153a, and the movement of the temperature sensor 140a along the X-axis and Y-axis directions, i.e., the movement of the temperature sensor 140a along a plane where the temperature sensor 140a contacts the one surface 111, may be prevented or substantially prevented by the bus-bar holder 130. Specifically, an opening 131 with a size corresponding to the exterior of the temperature sensor 140a is formed in the bus-bar holder 130, and the temperature sensor 140a is inserted into the opening 131, so that it is possible to prevent or reduce the movement of the temperature sensor 140a along the X-axis and Y-axis while allowing the temperature sensor 140a to be in contact with the battery cell 110 through the opening 131. However, the bus-bar holder 130 is not necessarily an essential member of the battery module 100c, and it will be apparent to a person of ordinary skill in the art that the movement of the temperature sensor 140a may be prevented or reduced by attaching the temperature sensor 140a to the battery cell 110.

Although it has been described in this embodiment that the leaf spring 154a is formed from the cover 153a of the case 150a, the present invention is not limited thereto. That is, in another embodiment, the leaf spring 154a may be formed by cutting the end plate 151 and the connecting plate 152. Alternatively, the leaf spring 154a may be formed in a spacer member between the battery cells 110. In this case, the temperature sensor 140a may be in close contact with a side surface of the battery cell 110 rather than the surface 111 from which the electrode tab 114 of the battery cell 110 protrudes.

Meanwhile, the temperature sensor 140a, as shown in FIG. 3, may include a head 143, a connecting portion 144, a metal portion 145 and a resin portion 146. In this case, the head 143 measures a temperature of the battery cell 110, and a connecting portion 144 is connected to the head 143 to provide the temperature of the battery cell 110 measured by the head 143 to the protective circuit module or the battery control system. The metal portion 145 forms the first surface 141 of the temperature sensor 140a. The metal portion 145 is mounted so that it contacts the battery cell 110, and the head 143 contacts an inner surface of the metal portion 145 so that an exact temperature measurement can be performed. The resin portion 146 forms the second surface 142 of the temperature sensor 140a. The resin portion 146 is mounted to cover the metal portion while overlapping the metal portion 145, and an outer surface of the resin portion 146 may contact an inner wall of the opening 131 of the bus-bar holder 130. At least portions of the head 143 and the connecting portion 144 may be positioned within the exterior structure formed by the metal portion 145 and the resin portion 146, and an epoxy resin 147 or the like may fill the area within the exterior structure formed by the metal portion 145 and the resin portion 146. The connecting portion 144 may protrude from the epoxy resin 147 in order to be connected to the protective circuit module, the battery control system, a wire, etc.

Figure 4:
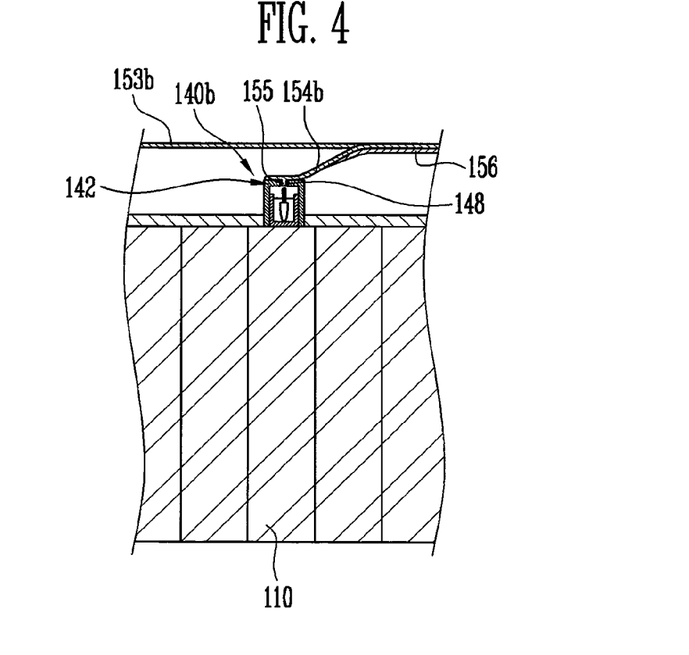
FIG. 4 is a sectional view of a battery module according to a modification of the battery module shown in FIG. 3.

FIG. 4 is a sectional view of a battery module 100b according to a modification of the battery module 100a shown in FIG. 3. Hereinafter, the battery module 100b according to this embodiment will be described with reference to FIG. 4. Here, components identical or corresponding to those of the aforementioned embodiment are designated by like reference numerals, and their detailed descriptions will be omitted to avoid redundancy.

According to this embodiment, A leaf spring 154b of a cover 153b has a protruding portion 155, and a groove 148 may be formed in a second surface 142 of a temperature sensor 140b. In this case, the protruding portion 155 of the leaf spring 154b may be mounted in the groove 148. Accordingly, although there is resistance in assembling the cover 153b, the leaf spring 154b can precisely press the temperature sensor 140b. Thus, although an assembly tolerance occurs, the temperature sensor 140b closely contacts the battery cell 110 so that it is possible to precisely measure the temperature of the battery cell 110.

The leaf spring 154b may further include a rib 156. In this case, the rib 156 may be connected to the leaf spring 154b along the length of the leaf spring 154b, and perform a function of supplementing the elasticity of the leaf spring 154b. In addition, the elasticity of the leaf spring 154b may be properly controlled by adjusting the height of the rib 156. That is, when the elasticity of the leaf spring 154b is weak, the height of the rib 156 may be increased, thereby increasing the elasticity of the leaf spring 154b.

Figure 5:
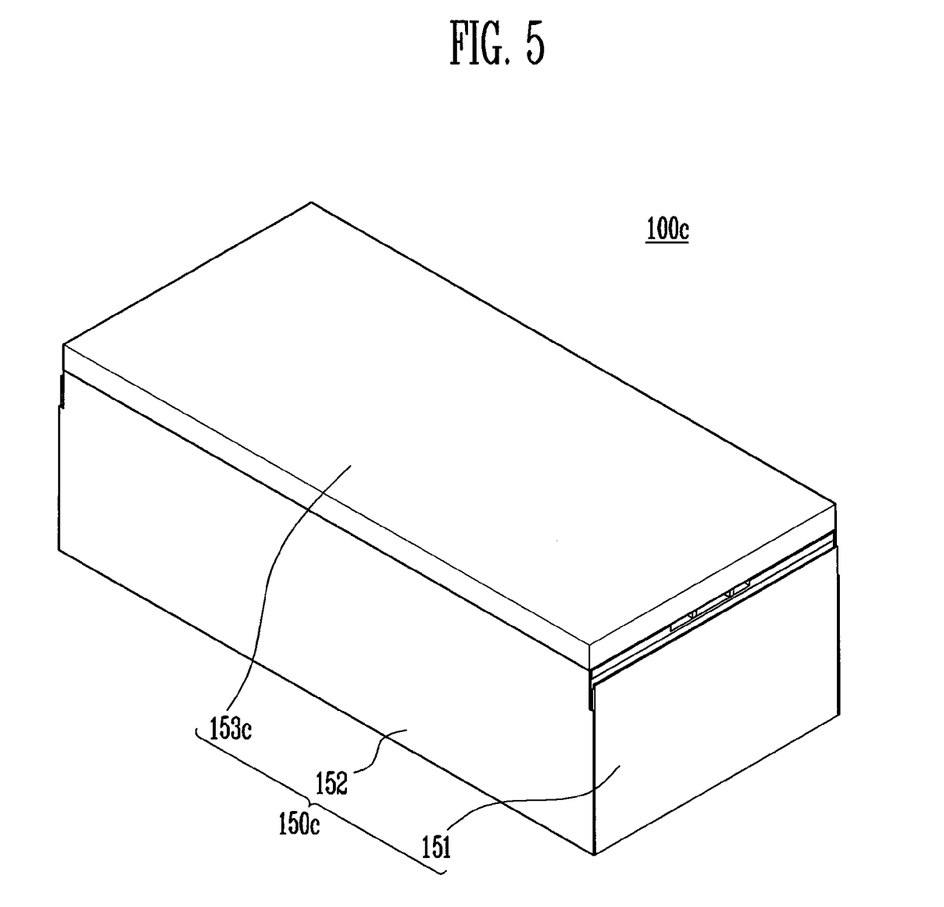
FIG. 5 is a perspective view of a battery module according to another embodiment of the present invention.
Figure 6:
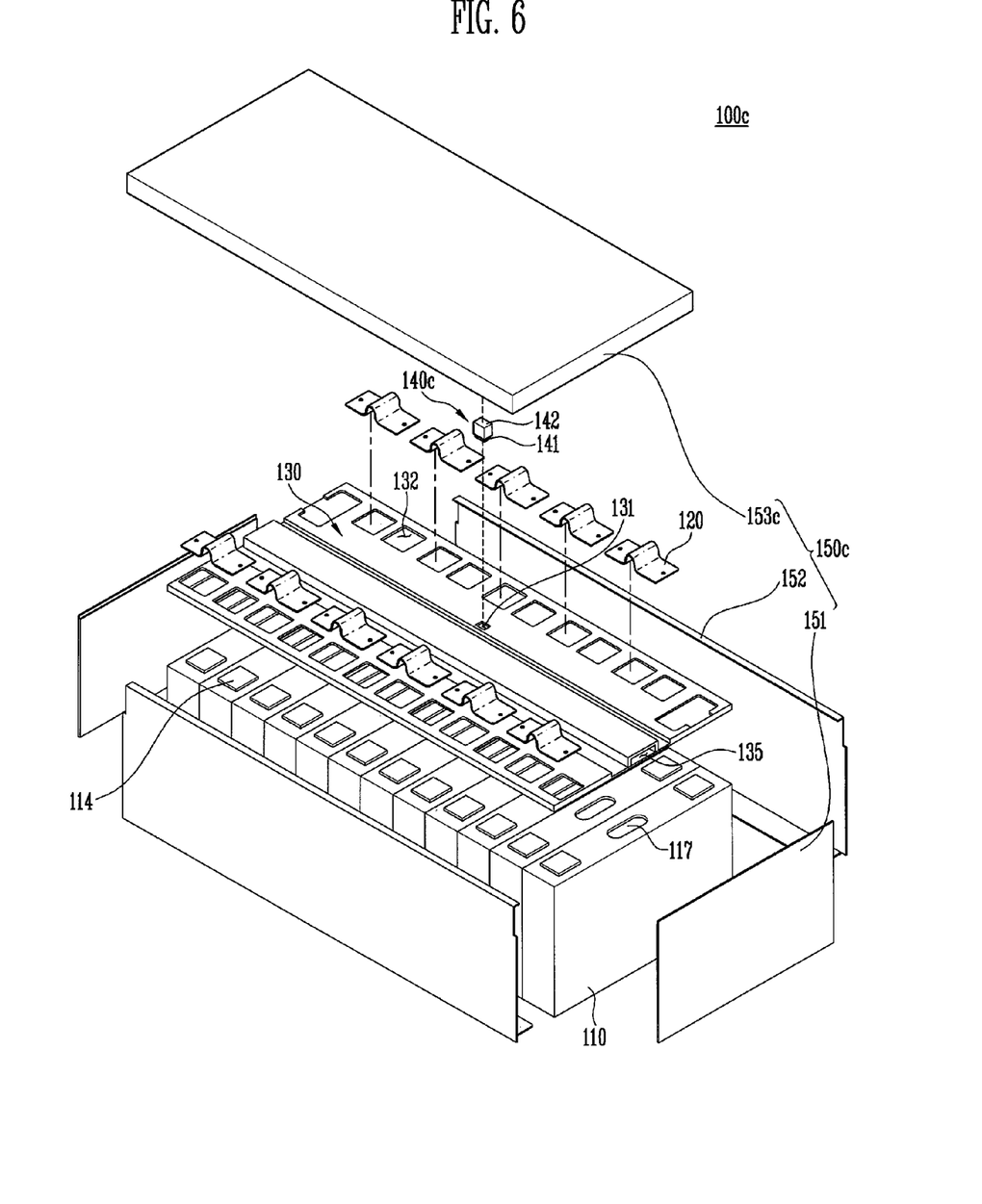
FIG. 6 is an exploded perspective view of the battery module shown in FIG. 5.
Figure 7:
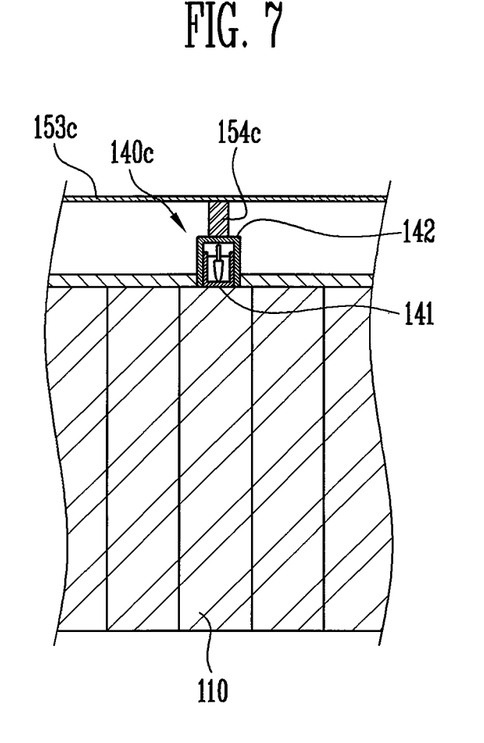
FIG. 7 is a sectional view of the battery module shown in FIG. 5.

FIG. 5 is a perspective view of a battery module 100c according to another embodiment of the present invention. FIG. 6 is an exploded perspective view of the battery module 100c shown in FIG. 5. FIG. 7 is a sectional view of the battery module 100c shown in FIG. 5. Hereinafter, the battery module 100c according to this embodiment will be described with reference to FIGS. 5 to 7. Here, components identical or corresponding to those of the aforementioned embodiment are designated by like reference numerals, and their detailed descriptions will be omitted to avoid redundancy.

As shown in FIGS. 5 to 7, the battery module 100c includes a plurality of battery cells 110, a temperature sensor 140c contacting at least one of the battery cells 110, and a case 150c configured to allow the temperature sensor 140c to contact at least one of the battery cells 110. A cover 153c may have an elastic part 154c (see FIG. 7).

In this embodiment, the elastic part 154c may protrude from the cover 153c. The elastic part 154c presses against a second surface 142 of the temperature sensor 140c so that a first surface 141 of the temperature sensor 140c can closely contact the battery cell 110. In this case, the elastic part 154c may be, for example, a leaf spring, a coil spring, rubber or the like. Unlike the aforementioned embodiment, the elastic part 154c may not be integrally formed with the cover 153c. Thus, the cover 153 can have a smooth surface without any incisions.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims, and their equivalents.

What is claimed is:

1. A battery module comprising:
   a plurality of battery cells aligned in one direction, each of the battery cells comprising electrode tabs protruding from one surface of the battery cell;
   a temperature sensor having a first surface contacting the one surface of at least one battery cell of the plurality of battery cells to measure a temperature of the at least one battery cell; and
   a case comprising a leaf spring configured to press against a second surface of the temperature sensor opposite to the first surface,
   wherein contact between the first surface of the temperature sensor and the at least one battery cell is maintained by the leaf spring.

2. The battery module of claim 1, wherein the case comprises:
   end plates respectively positioned adjacent one or more outermost battery cells of the plurality of battery cells;
   a connecting plate configured to connect the end plates; and
   a cover configured to cover the surfaces of the plurality of battery cells from which the electrode tabs protrude.

3. The battery module of claim 2, wherein the electrode tabs of the at least one battery cell protrude from the one surface of the at east one battery cell toward the cover.

4. The battery module of claim 1, further comprising:
   bus-bars configured to electrically connect the electrode tabs of the plurality of battery cells; and
   a bus-bar holder positioned to cover surfaces of the electrode tabs of the plurality of battery cells, the bus-bar holder being positioned between the plurality of battery cells and the bus-bars,
   wherein the cover covers the bus-bars and the bus-bar holder.

5. The battery module of claim 4, wherein the temperature sensor is configured to be inserted through an opening in the bus-bar holder so as to contact the at least one battery cell of the plurality of battery cells.

6. The battery module of claim 1, wherein the case comprises the leaf spring pressing the temperature sensor in the direction of the at least one battery cell.

7. The battery module of claim 6, wherein the case comprises the leaf spring formed by cutting the case.

8. The battery module of claim 7, wherein the leaf spring has a rib extended along a length of the leaf spring.

9. The battery module of claim 6, wherein the second surface of the temperature sensor has a groove, and the leaf spring comprises a protruding portion configured to be mounted in the groove.

10. The battery module of claim 1, wherein:
    the first surface of the temperature sensor comprises a metal portion;
    the second surface of the temperature sensor comprises a resin portion configured to cover an outer surface of the metal portion; and
    wherein the temperature sensor further comprises:
       a head in contact with an inner surface of the metal portion, the head being configured to measure a temperature of the at least one battery cell; and
       a connecting portion configured to provide the temperature of the at least one battery cell as measured by the head to a protective circuit module or a battery control system.

11. The battery module of claim 10, wherein at least portions of the head and the connecting portion are positioned inside a structure formed by the metal portion and the resin portion.

12. A battery module comprising:
    a plurality of battery cells aligned in one direction;
    a temperature sensor having a first surface contacting at least one of the battery cells and being configured to measure a temperature of the at least one battery cell; and
    a case having a bent portion contacting a second surface of the temperature sensor opposite to the first surface, the bent portion comprising a leaf spring to press the first surface of the temperature sensor onto the at least one battery cell.

* * * * *